United States Patent
Ominato et al.

(10) Patent No.: US 8,134,780 B2
(45) Date of Patent: Mar. 13, 2012

(54) PRISM AND LIGHTING DEVICE

(75) Inventors: Hiroyuki Ominato, Nagoya (JP); Takeshi Kitakata, Kuwana (JP); Shunsuke Ichizawa, Kiyose (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 12/659,821

(22) Filed: Mar. 23, 2010

(65) Prior Publication Data

US 2010/0238666 A1    Sep. 23, 2010

(30) Foreign Application Priority Data

Mar. 23, 2009   (JP) ................. 2009-069561

(51) Int. Cl.
  *G02B 5/02* (2006.01)
  *G02B 5/04* (2006.01)
  *G02B 17/00* (2006.01)
  *G02B 27/10* (2006.01)
  *F21V 5/02* (2006.01)
  *F21V 5/04* (2006.01)
  *F21V 7/00* (2006.01)

(52) U.S. Cl. ........ 359/599; 359/619; 359/627; 359/727; 359/730; 359/834; 359/837; 362/299; 362/308; 362/327; 362/335; 362/337; 362/340; 362/800

(58) Field of Classification Search ............ 359/627, 359/726, 727, 730, 833, 834, 837, 599, 619; 358/731; 362/299, 308, 327, 335, 337, 340, 362/800

See application file for complete search history.

(56) References Cited

U.S. PATENT DOCUMENTS

| | | | | | |
|---|---|---|---|---|---|
| 2,215,900 | A | * | 9/1940 | Bitner | 362/309 |
| 2,224,178 | A | * | 12/1940 | Bitner | 362/337 |
| 2,356,654 | A | * | 8/1944 | Cullman | 362/223 |
| 4,767,172 | A | * | 8/1988 | Nichols et al. | 385/146 |
| 4,880,974 | A | * | 11/1989 | Yamakawa | 250/216 |
| 5,042,928 | A | * | 8/1991 | Richards | 359/728 |
| 6,547,423 | B2 | * | 4/2003 | Marshall et al. | 362/333 |
| 6,724,543 | B1 | * | 4/2004 | Chinniah et al. | 359/718 |
| 6,832,849 | B2 | * | 12/2004 | Yoneda et al. | 362/551 |
| 6,940,660 | B2 | * | 9/2005 | Blumel | 359/726 |
| 7,401,948 | B2 | * | 7/2008 | Chinniah et al. | 362/326 |
| 7,489,453 | B2 | * | 2/2009 | Chinniah et al. | 359/727 |
| 7,837,349 | B2 | * | 11/2010 | Chinniah et al. | 362/244 |

FOREIGN PATENT DOCUMENTS

JP    A 2001-312912    11/2001

\* cited by examiner

*Primary Examiner* — Ricky Shafer
(74) *Attorney, Agent, or Firm* — Oliff & Berridge, PLC (57) ABSTRACT

A prism includes a light incident portion that has first and second convex portions, the first and second convex portions each are a convex portion that refracts rays of light incident to a prism body and reduces a spread angle after incidence to the prism body via the convex portion to be smaller than that before the incidence, the spread angle is an angle between a given two of the rays, a first reflecting surface, provided on the prism body, that can reflect a first ray of light that has entered the prism body via the first convex portion, a first emitting portion, provided on the prism body, that emits, to the outside, the first ray reflected by the first reflecting surface, and a second emitting portion that emits, to the outside, a second ray of light that has entered the prism body via the second convex portion.

10 Claims, 12 Drawing Sheets

PRISM AND LIGHTING DEVICE

CROSS-REFERENCE TO RELATED APPLICATION

This Application claims priority to JP2009-069561, filed Mar. 23, 2009, the content of which is hereby incorporated by reference in its entirety.

BACKGROUND

The present invention relates to a prism included in a lighting device used in various types of devices, and the lighting device.

Lighting devices have been used that include a prism to perform light distribution control of light emitted from a light source (refer to Japanese Laid-Open Patent Publication No. 2001-312912, for example). Examples of the known lighting devices include a lighting device arranged in a display showcase. This lighting device includes a transparent light guiding member that guides light from a light source device to a predetermined position of an exhibit storage portion, and a prism that controls light direction such that the light from the light guiding member illuminates an exhibit. The prism is fixed to an upper end of the light guiding member such that the vicinity of an end portion of one prism surface is attached firmly and such that emitted light is mainly emitted from that prism surface. Thus, the known lighting device can effectively illuminate a predetermined area.

SUMMARY

However, the light emitted from a light guiding member such as an optical fiber or the light emitted from a light source such as a chip light emitting diode is widely diffused. Therefore, with the known lighting device, if the prism is formed of transparent material only, when the rays from the light source enters a body of the prism, many rays are not reflected by a total internal reflection, and emitted from reflecting surfaces of the prism. As a result, the rays from the light source cannot be effectively used.

An object of the present disclosure is to provide a prism and a lighting device that are capable of improving the utilization rate of light from a light source.

Exemplary embodiments herein provide a prism that includes a light incident portion that has a first convex portion and a second convex portion, the first convex portion and the second convex portion each being a convex portion that refracts rays of light incident to a prism body and reduces a spread angle after incidence to the prism body via the convex portion to be smaller than the spread angle before the incidence, the spread angle is an angle formed between a given two of the rays, a first reflecting surface that is provided on the prism body and that is capable of reflecting a first ray of light that has entered the prism body via the first convex portion, a first emitting portion that is provided on the prism body and that emits, to the outside of the prism body, the first ray reflected by the first reflecting surface, and a second emitting portion that emits, to the outside of the prism body, a second ray of light that has entered the prism body via the second convex portion.

Exemplary embodiments also provide a lighting device that includes a prism and a light emitting diode light source. The prism includes a light incident portion that has a first convex portion and a second convex portion, the first convex portion and the second convex portion each being a convex portion that refracts rays of light incident to a prism body and reduces a spread angle after incidence to the prism body via the convex portion to be smaller than the spread angle before the incidence, the spread angle is an angle formed between a given two of the rays, a first reflecting surface that is provided on the prism body and that is capable of reflecting a first ray of light that has entered the prism body via the first convex portion, a first emitting portion that is provided on the prism body and that emits, to the outside of the prism body, the first ray reflected by the first reflecting surface, and a second emitting portion that emits, to the outside of the prism body, a second ray of light that has entered the prism body via the second convex portion.

BRIEF DESCRIPTION OF THE DRAWINGS

Exemplary embodiments of the invention will be described below in detail with reference to the accompanying drawings in which.

DETAILED DESCRIPTION OF THE EMBODIMENT(S)

Hereinafter, an embodiment of the present disclosure will be described with reference to the drawings. A prism 10 includes a light incident portion 20, a first reflecting surface 30, a first emitting portion 40 and a second emitting portion 50. A prism body 11 of the prism 10 is formed of a plastic material such as polycarbonate resin, acrylic resin or the like. The surface of the prism body 11 is substantially mirror finished, for example, except a portion of the surface to which texturing is applied (which will be described later). Respective structural elements of the prism 10 will be described in detail below.

Figure 2:
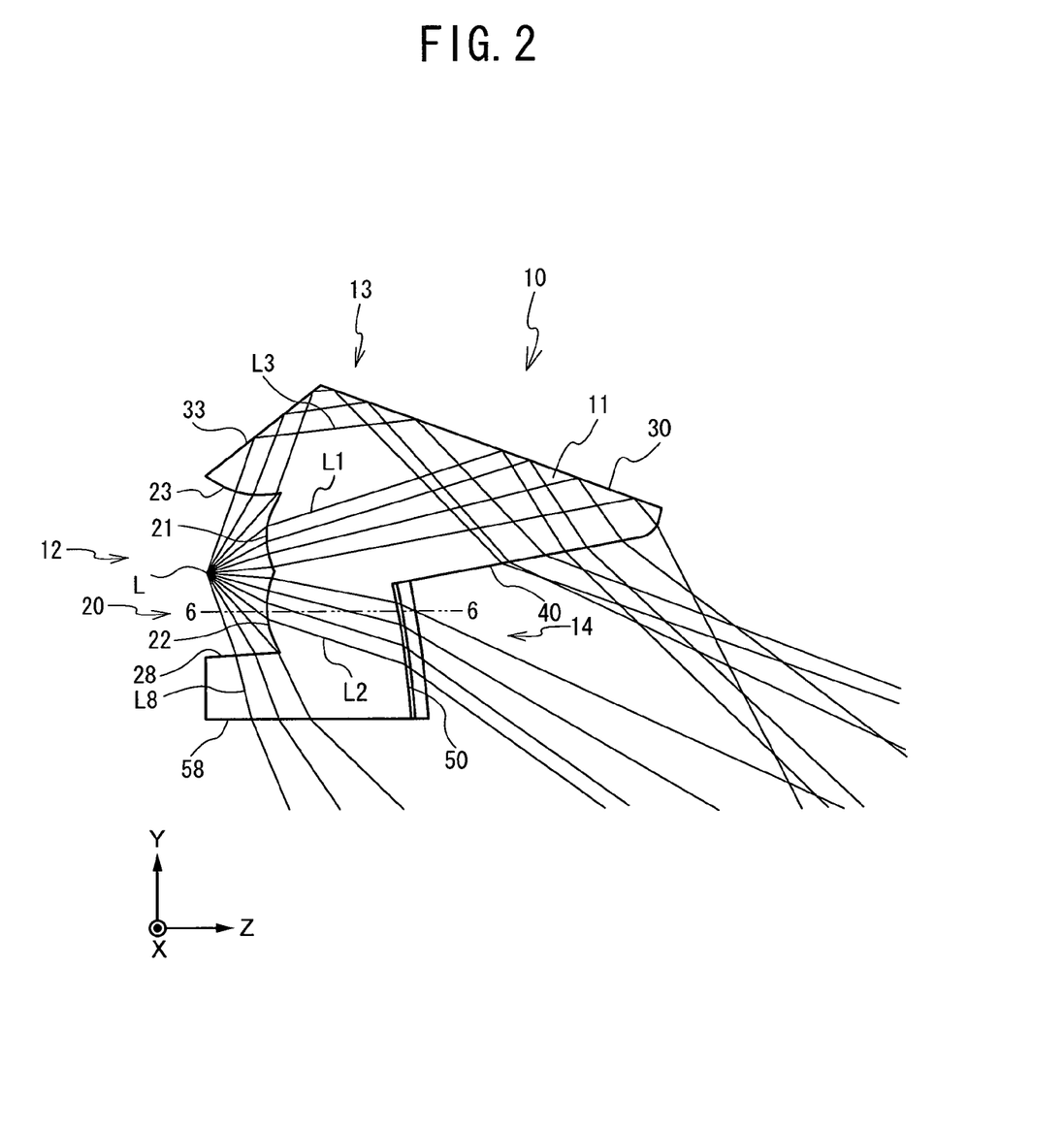
FIG. 2 is a side view of the prism.

FIG. 2 illustrates paths of rays of light that enter the prism 10 from a light source L and that are then emitted from the first emitting portion 40 and the second emitting portion 50 etc. The ray paths are simply and schematically illustrated for ease of explanation. For explanatory convenience, FIG. 2 to FIG. 5 and FIG. 8 to FIG. 11 illustrate rays when the light source L is a point light source. With respect to the prism 10, a side on which the light source L is arranged is referred to as a front surface side 12 (the left side in FIG. 2, and the minus side of the Z axis of the prism 10), an opposite side of the front surface side 12 is referred to as a back surface side 14 (the right side in FIG. 2, and the plus side of the Z axis of the prism 10), and an upper side of the prism 10 is referred to as an upper surface side 13 (the upper side in FIG. 2, and the plus side of the Y axis of the prism 10).

Figure 1:
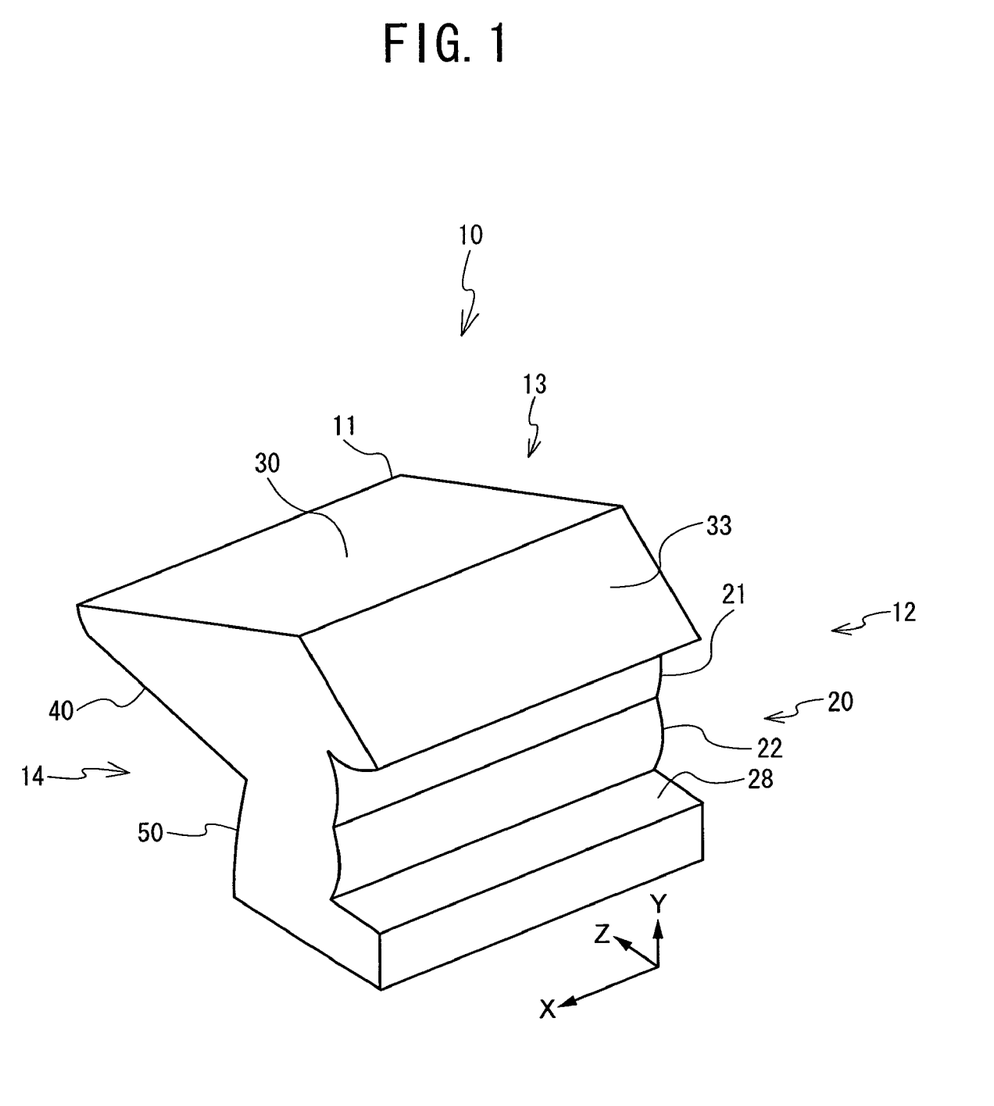
FIG. 1 is a perspective view showing an entire structure of a prism.

First, the light incident portion 20 will be described. The light incident portion 20 includes a first convex portion 21, a second convex portion 22, a third convex portion 23 and a flat surface 28. The first convex portion 21 and the second convex portion 22 are located on the front surface side 12 (on the side facing the light source L) of the prism body 11. The first and second convex portions 21 and 22 are provided to reduce a spread angle of the rays that are emitted from the light source L and that enter into the prism body 11, such that the spread angle after the incidence is smaller than the spread angle before the incidence. A light source such as a chip light emitting diode is used as the light source L. The third convex portion 23 is contiguous with an upper end of the first convex portion 21. The flat surface 28 is contiguous with a lower end of the second convex portion 22. Note that the spread angle is an angle formed between two given rays that are emitted from the light source L. The spread angle is defined such that the angle between the rays that spread out from the light source L is a plus angle, and the angle between the rays that converge is a minus angle. In the description below, when spread angles are compared, their absolute values are used. In the embodiment, the first to third convex portions 21 to 23 each have a convex shape that protrudes outwardly from the prism 10, and the first to third convex portions 21 to 23 each have substantially the same radius of curvature. The first to third convex portions 21 to 23 each extend in a width direction of the prism 10 (the arrow X direction in FIG. 1). The first to third convex portions 21 to 23 will be respectively described below in that order.

Figure 3:
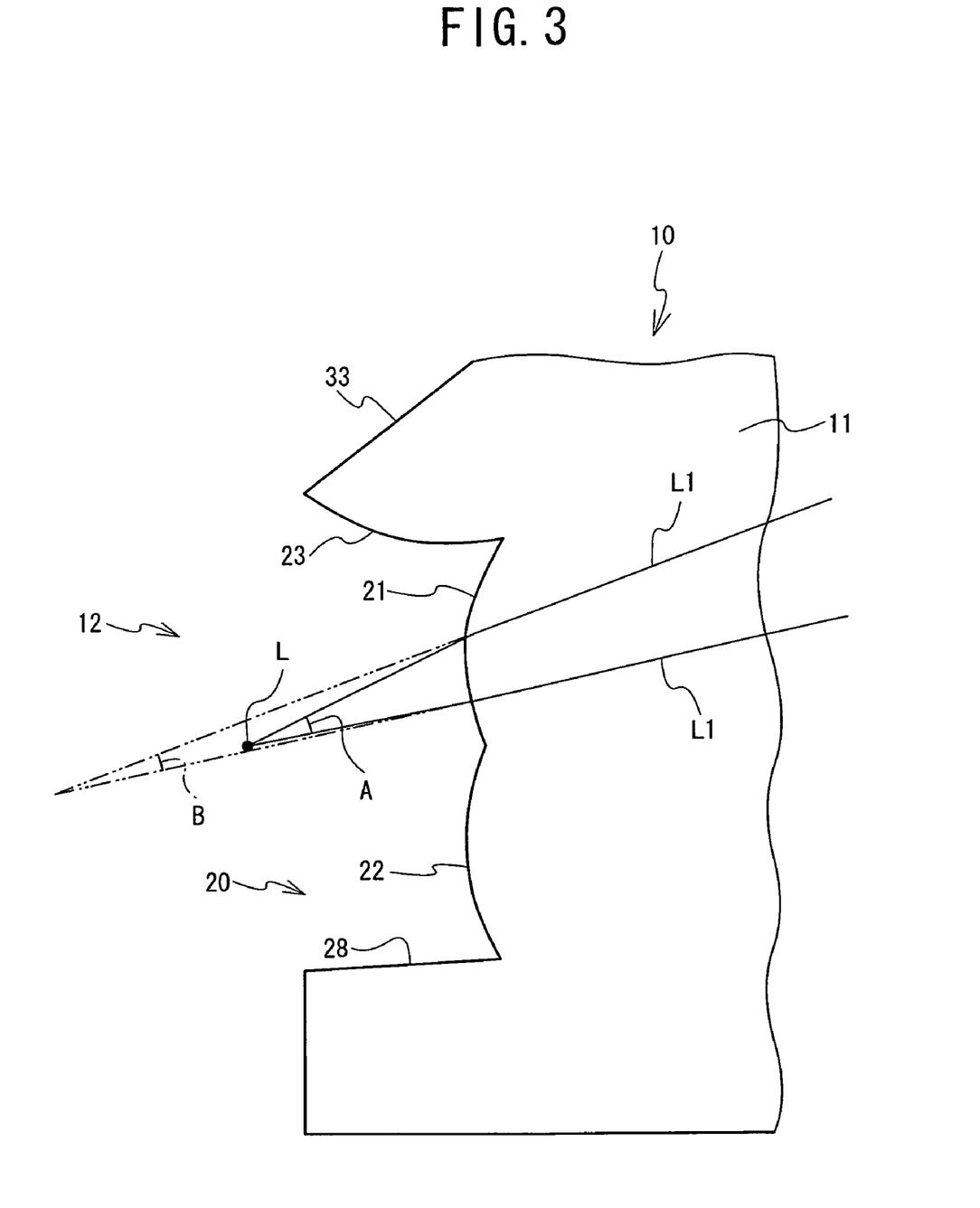
FIG. 3 is a main part enlarged view, in which a light incident portion of the prism is enlarged.

The spread angle with respect to the first convex portion 21 will be described with reference to FIG. 3. FIG. 3 illustrates paths of rays L1 that enter the prism body 11 from the light source L via the first convex portion 21. The paths of the rays L1 are enlarged for ease of explanation, and other ray paths are omitted. As shown in FIG. 3, an angle A is the spread angle before the rays L1 emitted from the light source L enter the first convex portion 21. On the other hand, an angle B is the spread angle of the rays L1 that have entered the prism body 11 from the light source L via the first convex portion 21. In this manner, the first convex portion 21 is structured such that the spread angle B is smaller than the spread angle A.

For this reason, because the rays L1 enter the prism body 11 via the first convex portion 21, incidence angles to the first reflecting surface 30 (which will be described later) are substantially equalized in a height direction of the prism 10 (in the up-down direction in FIG. 2). Accordingly, the prism 10 can be designed such that the first reflecting surface 30 effectively reflects the rays L1, preferably such that the first reflecting surface 30 effectively causes total internal reflection of the rays L1, namely, the incidence angle to the first reflecting surface 30 is equal to or more than a critical angle. Thus, the prism 10 can increase the rate of light utilization. Further, because the spread angle of the rays L1 is reduced, the radius of an incident light flux to the first reflecting surface 30 is reduced. Therefore, the size of the first reflecting surface 30 of the prism 10 can be reduced. Meanwhile, in a front-rear direction of the prism 10 (the arrow Z direction in FIG. 1), the rays L1, which are emitted from the light source L and enter the prism body 11 via the first convex portion 21, are emitted from the first emitting portion 40 (refer to FIG. 2), which will be described later, to an illumination target area.

Figure 4:
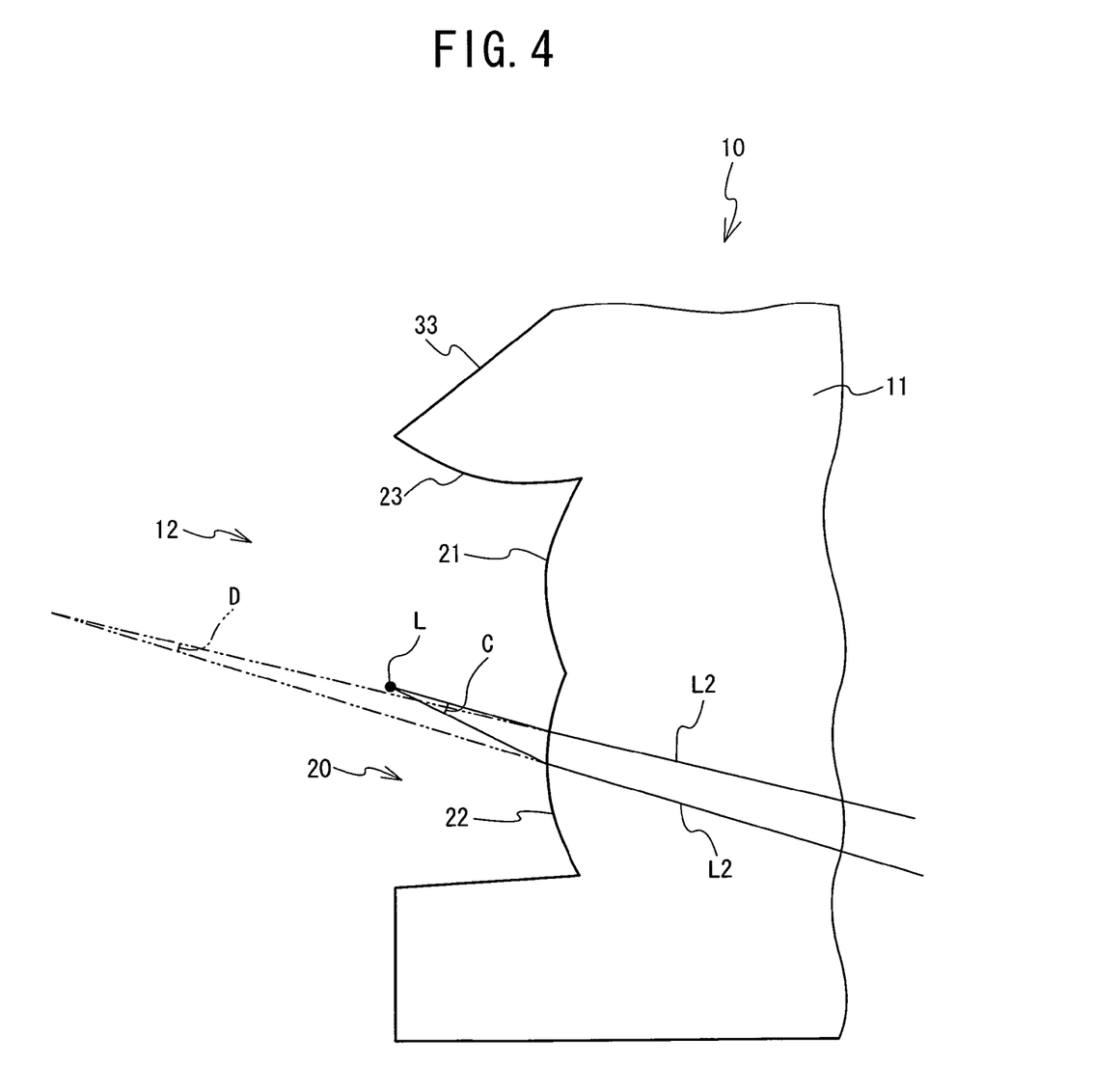
FIG. 4 is another main part enlarged view, in which the light incident portion of the prism is enlarged.

Next, the second convex portion 22 is formed to be contiguous with a lower end of the first convex portion 21. The spread angle with respect to the second convex portion 22 will be described with reference to FIG. 4. FIG. 4 illustrates paths of rays L2 that enter the prism body 11 from the light source L via the second convex portion 22. The paths of the rays L2 are enlarged for ease of explanation, and other ray paths are omitted. As shown in FIG. 4, an angle C is the spread angle before the rays L2 emitted from the light source L enter the second convex portion 22. On the other hand, an angle D is the spread angle of the rays L2 that have entered the prism body 11 from the light source L via the second convex portion 22. In this manner, the second convex portion 22 is structured such that the spread angle D is smaller than the spread angle C.

Because the rays L2 enter the prism body 11 via the second convex portion 22, incidence angles to the second emitting portion 50 (refer to FIG. 2), which will be described later, are substantially equalized in the height direction of the prism 10 (in the up-down direction in FIG. 2). Accordingly, unlike the paths of the rays L1, the prism 10 can be designed such that the rays L2 can be emitted from the second emitting portion 50, which will be described later. The prism 10 can enlarge or contract an illuminated area by emitting the rays from the first emitting portion 40 and the second emitting portion 50, or the prism 10 can suppress generation of shadow by illuminating the illumination target area from a plurality of directions. Meanwhile, in the width direction of the prism 10 (the arrow X direction in FIG. 1), the rays L2 that enter the prism body 11 are emitted from the second emitting portion 50 to the illumination target area.

Figure 5:
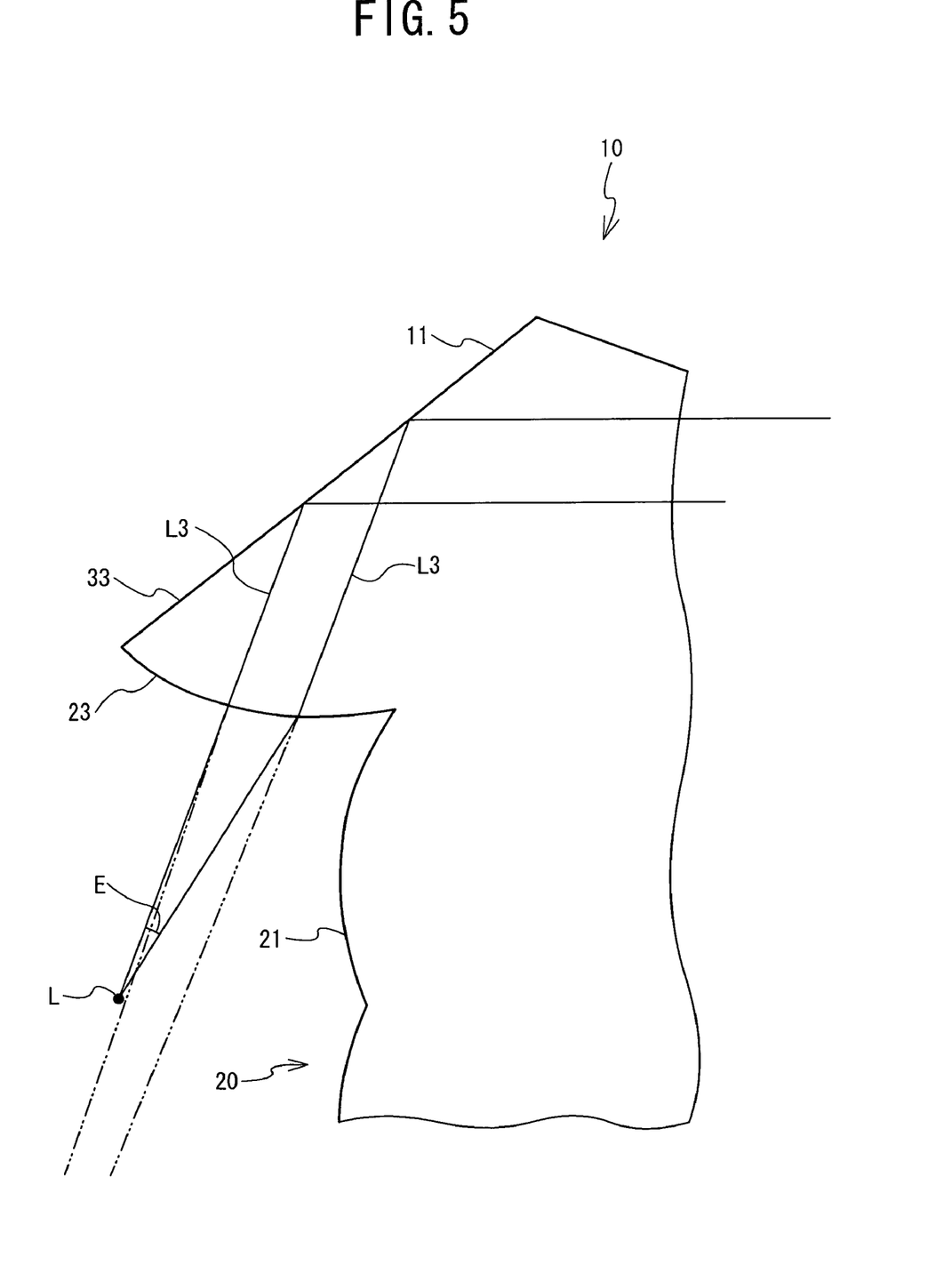
FIG. 5 is another main part enlarged view, in which the light incident portion of the prism is enlarged.

Further, the third convex portion 23 is formed to be contiguous with an upper end of the first convex portion 21. The spread angle with respect to the third convex portion 23 will be described with reference to FIG. 5. FIG. 5 illustrates paths of rays L3 that enter the prism body 11 from the light source L via the third convex portion 23. The paths of the rays L3 are enlarged for ease of explanation, and other ray paths are omitted. As shown in FIG. 5, an angle E is the spread angle before the rays L3 emitted from the light source L enter the third convex portion 23. Although the spread angle of the rays L3 that have entered the prism body 11 from the light source L via the third convex portion 23 is not shown in FIG. 5, the third convex portion 23 is structured such that this spread angle is smaller than the angle of E.

For this reason, incidence angles to a third reflecting surface 33 (which will be described later) of the rays L3 that have entered the prism body 11 via the third convex portion 23 are substantially equalized in the height direction of the prism 10 (in the up-down direction in FIG. 2). Accordingly, the prism 10 can be designed such that the third reflecting surface 33 effectively causes total internal reflection of the rays L3, namely, such that the incidence angle to the third reflecting surface 33 of the light beans L3 is equal to or more than a critical angle. Thus, the prism 10 can increase the rate of light utilization. Further, because the spread angle of the rays L3 that have entered the prism body 11 is reduced, the radius of an incident light flux to the third reflecting surface 33 is reduced. Therefore, the size of the third reflecting surface 33 of the prism 10 can be reduced. In the front-rear direction of the prism 10 (the arrow Z direction in FIG. 1), the rays L3 are reflected by the third reflecting surface 33 to the first reflecting surface 30.

For example, more specifically, it is preferable that the spread angle after the rays from the light source L have entered the prism body 11 is approximately −15 degrees to +15 degrees. In the light incident portion 20 shown in FIG. 2, rays L8 that are incident from the flat surface 28 is emitted from an emitting surface 58. The rays L8 do not have a direct relationship with the present disclosure, and the illumination target area may be enlarged by the emitting surface 58.

Next, other structural elements of the prism 10 will be described. In FIG. 2, the first reflecting surface 30 is located on the upper surface side 13 of the prism body 11, and the first reflecting surface 30 can reflect the rays L1 that have entered the prism body 11 via the first convex portion 21 and the rays L3 that have entered the prism body 11 via the third convex portion 23. In the embodiment, the first reflecting surface 30 has a flat shape, and is formed to incline downwardly toward the back surface side 14 such that the incidence angle to the first reflecting surface 30 of the rays L1 and L3 is equal to or more than a critical angle. In other words, the first reflecting surface 30 is structured such that it can theoretically cause total internal reflection of the rays L1 that have entered the prism body 11 via the first convex portion 21. With this structure, even if the light source is not a perfect point light source, or even if the first reflecting surface 30 is not a perfect flat surface (a mirror surface), the amount of rays that are not reflected by a total internal reflection, and actually emitted from the first reflecting surface 30 is extremely small. Therefore, the prism 10 does not have to be provided with a reflecting material or the like for the purpose of increasing the reflection coefficient of the rays L1 and L3 on the first reflecting surface 30. More specifically, let us assume a case in which the prism body 11 is formed of polycarbonate with an index of refraction of 1.585. In this case, if the incidence angle of light to the first reflecting surface 30 is set to be equal to or more than 39 degrees, which is the critical angle, total internal reflection of the rays L1 are caused by the first reflecting surface 30.

The third reflecting surface 33 is located on the upper surface side 13 of the prism 10, and can reflect the rays L3 that have entered the prism body 11 via the third convex portion 23. In the present embodiment, the third reflecting surface 33 is a flat reflecting surface that is formed on the front surface side 12 such that it is contiguous with an upper end of the third convex portion 23. In the embodiment, the third reflecting surface 33 is structured such that it can theoretically cause total internal reflection of the rays L3 that have entered the prism body 11 via the third convex portion 23. Similarly to the first reflecting surface 30, the amount of rays that are not reflected by a total internal reflection, and emitted from the third reflecting surface 33 is extremely small. Therefore, the prism 10 does not have to be provided with a reflecting material or the like on the third reflecting surface 33.

The first emitting portion 40 is located on the back surface side 14 of the prism body 11. The first emitting portion 40 is formed such that it can illuminate a desired area from above (as shown in FIG. 2) by emitting the rays L1 that are totally and internally reflected by the first reflecting surface 30, and the rays L3 that are totally and internally reflected by the third reflecting surface 33 and the first reflecting surface 30. In the embodiment, the first emitting portion 40 is formed to be contiguous with a lower end of the first reflecting surface 30, and the first reflecting surface 30 and the first emitting portion 40 form a substantially wedge shape in a side view.

The second emitting portion 50 emits the rays L2 that have entered the prism body 11 via the second convex portion 22. The second emitting portion 50 is formed on the back surface side 14 of the prism 10. In the present embodiment, the second emitting portion 50 is formed in a position that generally faces the light incident portion 20. The structure of the second emitting portion 50 will be described in more detail below with reference to FIG. 6.

Figure 6:
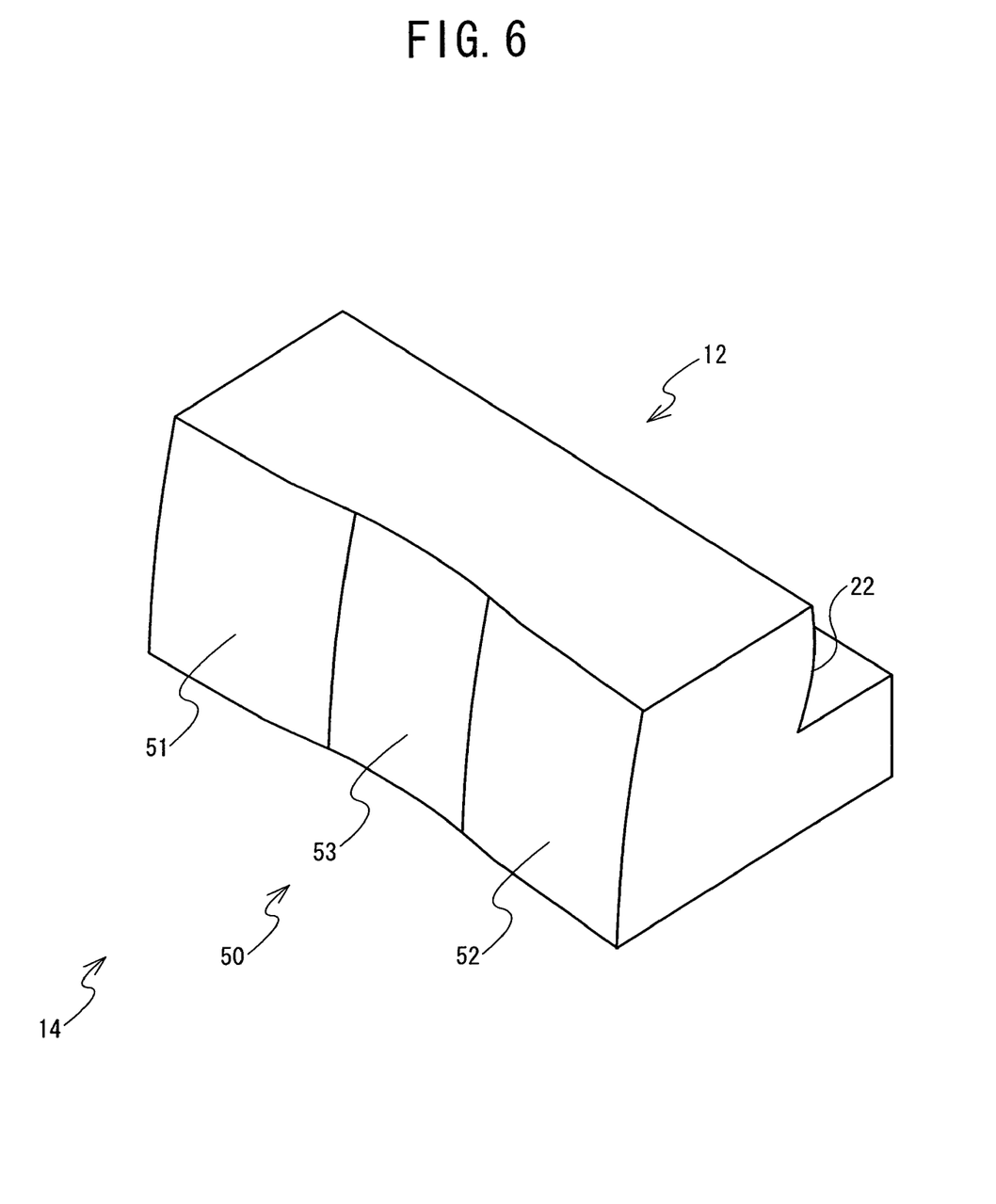
FIG. 6 is a cross sectional view of a second emitting portion taken along a line 6-6 of FIG. 2.

As shown in FIG. 6, the second emitting portion 50 includes a first light emitting surface 51, a second light emitting surface 52 and a third light emitting surface 53. The first light emitting surface 51 and the second light emitting surface 52 each have a convex curved surface. The third light emitting surface 53 has a concave curved surface that couples the first light emitting surface 51 and the second light emitting surface 52. A shape of the above-described convex curved surface or concave curved surface is defined as seen from the outside of the prism 10. With this structure, owing to the first light emitting surface 51 and the second light emitting surface 52, the prism 10 can expand an illumination range of the light emitted in a horizontal direction (in a direction perpendicular to the up-down direction in FIG. 2). Further, while the prism 10 is emitting light to a desired illumination target area by utilizing differences in emission angles of light emitted from the first light emitting surface 51, the second light emitting surface 52 and the third light emitting surface 53, the prism 10 can reduce unevenness in illuminance owing to the third light emitting surface 53.

In the embodiment, the first light emitting surface 51 and the second light emitting surface 52 are formed by convex curved surfaces, and the radius of curvature of the first light emitting surface 51 is substantially the same as that of the second light emitting surface 52. The radius of curvature of the first light emitting surface 51 and the second light emitting surface 52 is preferably larger than the radius of curvature of the third light emitting surface 53. These radii of curvature can be appropriately adjusted in accordance with the illumination target area, and the first light emitting surface 51, the second light emitting surface 52 and the third light emitting surface 53 may be formed by free-form surfaces or the like.

Figure 7:
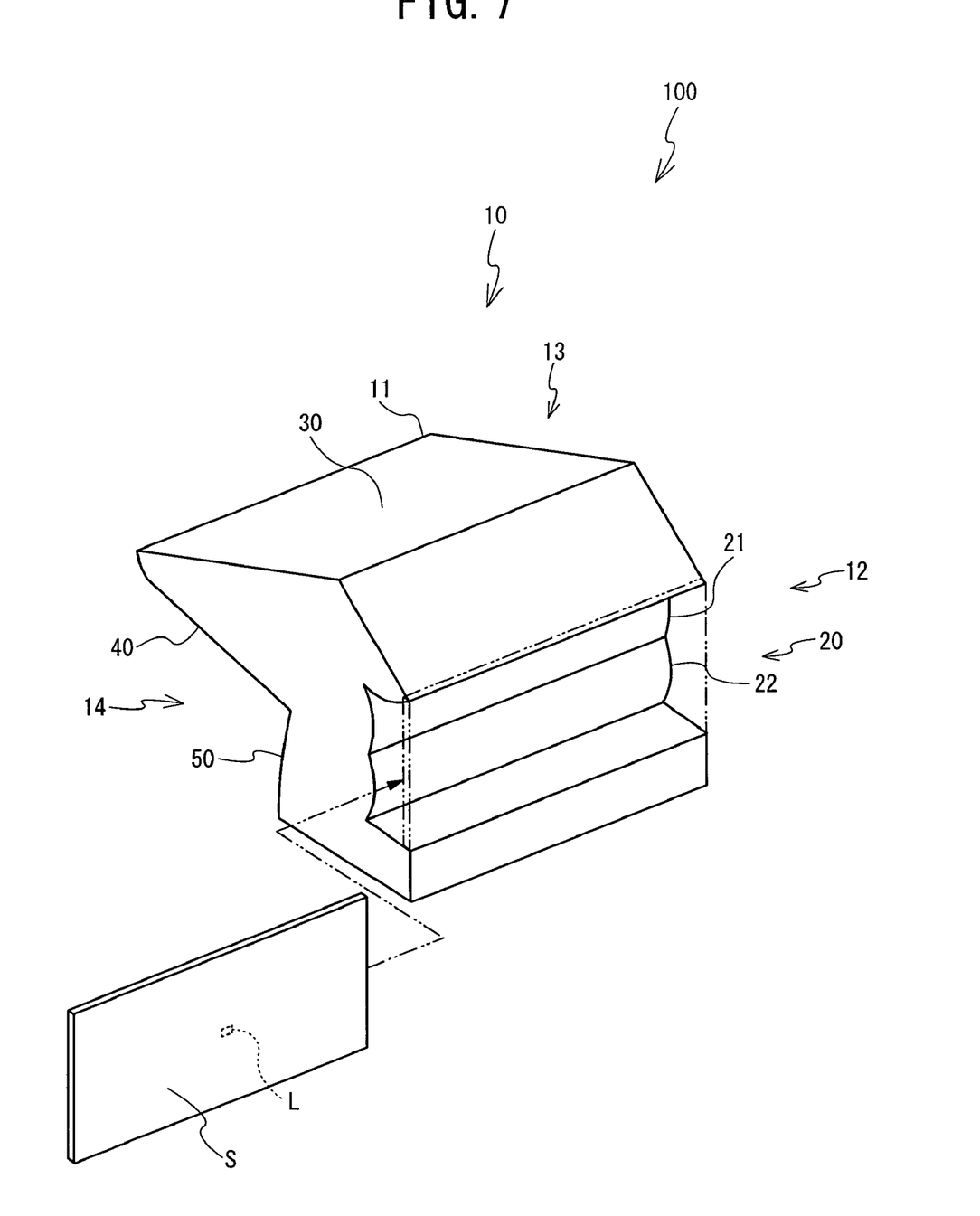
FIG. 7 is a perspective view showing an overview when the prism is used in a lighting device.

As shown in FIG. 7, the prism 10 can be used in a lighting device 100 that uses, for example, a chip light emitting diode as a light source L. The light source L is placed on a flat-plate shaped support plate S and is fixed to the front surface side 12 of the prism 10 together with the support plate S. The lighting device 100 can be used, for example, to illuminate a needle drop point or the vicinity of the needle drop point of a sewing machine. The light source L may be formed by a white light emitting diode (LED), for example. The light source L may be formed by a white lighting device that uses a plurality of light sources (for example, a combination of red (R), green (G) and blue (B)). The light source L may be formed by a plurality of white LEDs, a single LED or a plurality of LEDs. Examples of the LED light source include a white light emitting surface mount LED with a reflector "SMLK15WBFAW1A" made by ROHM Co. Ltd.

With the above structure, it is possible to effectively improve the utilization rate of the light that has entered the prism 10. If, for example, divergent light from the light source, such as a chip LED, enters the prism body via a flat prism surface or concave curved prism surface, the light is propagated as reasonable divergent light even in a prism medium. In this case, if it is attempted to increase the utilization rate of the light incident to the prism, the prism needs to be provided with a relatively large reflecting surface. Consequently, the size of the prism tends to be larger as a whole. Contrary to this, in the present embodiment, because the rays from the light source L enter the prism body 11 via the first convex portion 21, the second convex portion 22 and the third convex portion 23, the spread angle of the rays (namely, the rays L1, L2 and L3 in FIG. 2) that have entered the prism body 11 can be made smaller than the spread angle of the rays before entering the prism body 11. When the rays after entering the prism body 11 enter a reflecting surface (preferably, a total internal reflecting surface), the light flux diameter becomes smaller. Therefore, the prism 10 can reflect rays in a desired direction using a relatively small reflecting surface. Thus, it is possible to reduce the entire size of the prism body 11.

Further, the prism 10 can reduce the ratio of the rays that enter the prism body 11 and that are then emitted from the first reflecting surface 30 or the third reflecting surface 33. The rays that have been effectively reflected by the first reflecting surface 30 or the third reflecting surface 33 are emitted from an emitting portion to illuminate the illumination target area. Therefore, the prism 10 can improve the rate of light utilization. In addition, by combining the light incident portion 20, in which the first to third convex portions 21 to 23 are formed, the first and third reflecting surfaces 30 and 33, and the first and second emitting portions 40 and 50, illuminance adjustment and design of the illumination target area can be easily performed. For example, the prism 10 can easily achieve concentrated focus on the illumination target area or increase partial illuminance of the illumination target area.

The above-described embodiment can be modified in various ways. For example, the center position and the size of the radius of curvature of the first convex portion 21, the second convex portion 22 and the third convex portion 23, and the inclined angle of the first reflecting surface 30 and the third reflecting surface 33 can be appropriately changed in design depending on an illumination target. In the present embodiment, the second emitting portion 50 is structured by the first light emitting surface 51, the second light emitting surface 52 and the third light emitting surface 53. However, as long as the light that has entered the prism body 11 via the second convex portion 22 can be emitted to the illumination target area, the second emitting portion 50 may be structured in a different way. Further, the attachment direction of the prism 10 may be appropriately changed depending on the positional relationship between the light source L and the illumination target area. Other modified examples of the prism will now be described below.

(1) Modified Example in which a Light Reflecting Portion Having a First Convex Portion is Formed In the above-described embodiment, the prism 10 includes the light incident portion 20 in which the first convex portion 21, the second convex portion 22 and the third convex portion 23 are formed. In this modified example, as shown in FIG. 8, the light that has entered the prism body via a flat incident surface is utilized.

Figure 8:
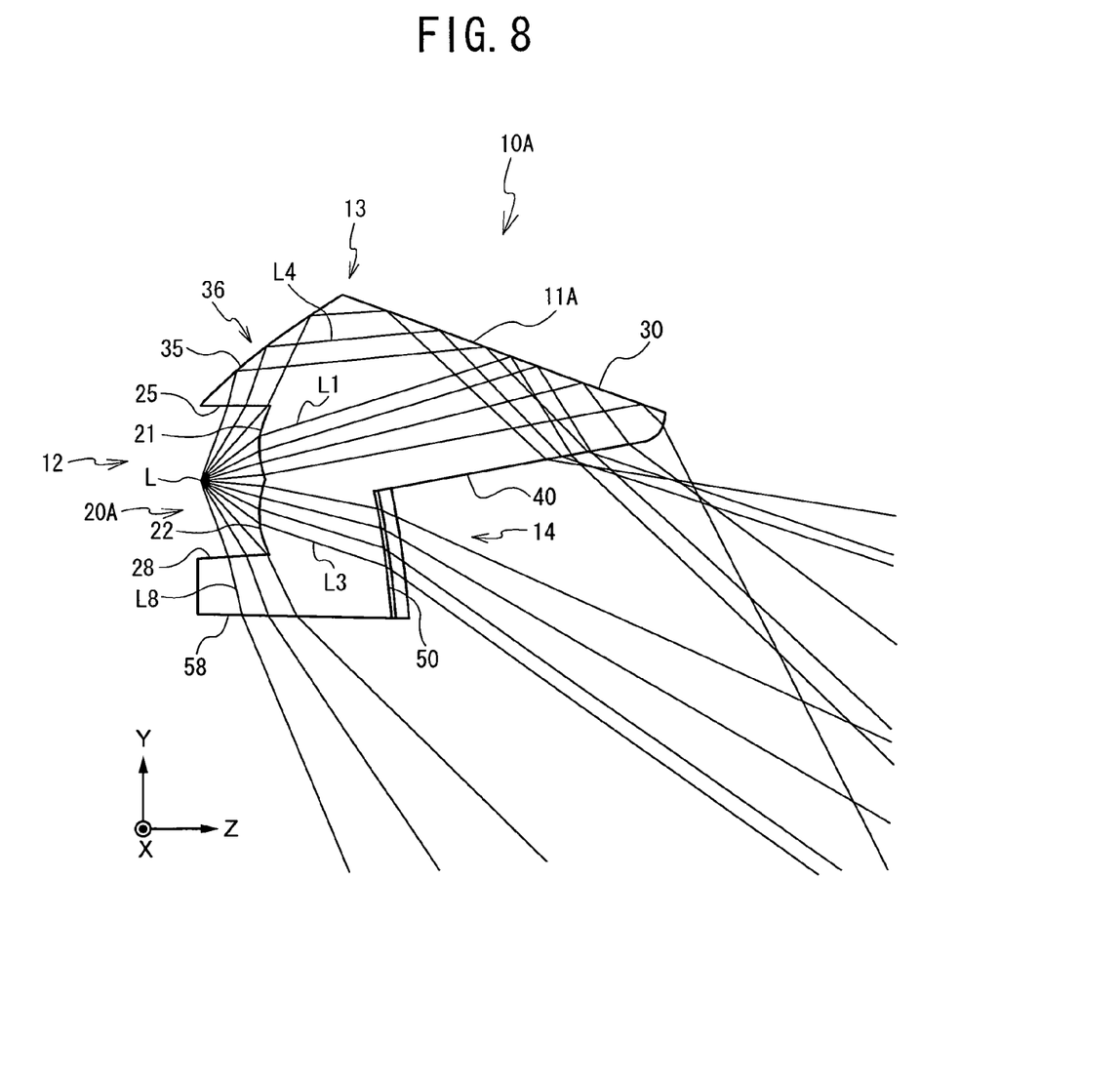
FIG. 8 is a side view of a prism according to a modified example.

FIG. 8 illustrates paths of rays of light that enter a prism body 11A from the light source L and then are emitted from the first emitting portion 40 and the second emitting portion 50 etc. The ray paths are simply and schematically illustrated for ease of explanation. Note that structural elements that are denoted with the same reference numeral as those in FIG. 1 to FIG. 7 have the same or similar structure, and repeated explanation of these structural elements is omitted.

In this modified example, as shown in FIG. 8, a light incident portion 20A includes the first convex portion 21, the second convex portion 22 and a flat incident surface 25. The incident surface 25 is formed to be contiguous with the upper end of the first convex portion 21.

A second reflecting surface 35 is located on the upper surface side 13 of a prism 10A, and can reflect rays L4 that have entered the prism body 11A via the incident surface 25. The second reflecting surface 35 includes a first reflecting convex portion 36 that reduces the spread angle of the rays such that the spread angle after the reflection is smaller than that before the reflection. In this modified example, the second reflecting surface 35 is designed such that it can cause total internal reflection of the rays L4 that have entered the prism body 11A via the incident surface 25. Note that the first reflecting convex portion 36 has a convex shape that protrudes outwardly from the prism 10A, and is formed as a concave shape with respect to the rays that are incident to the first reflecting convex portion 36 or reflected by the first reflecting convex portion 36.

Figure 9:
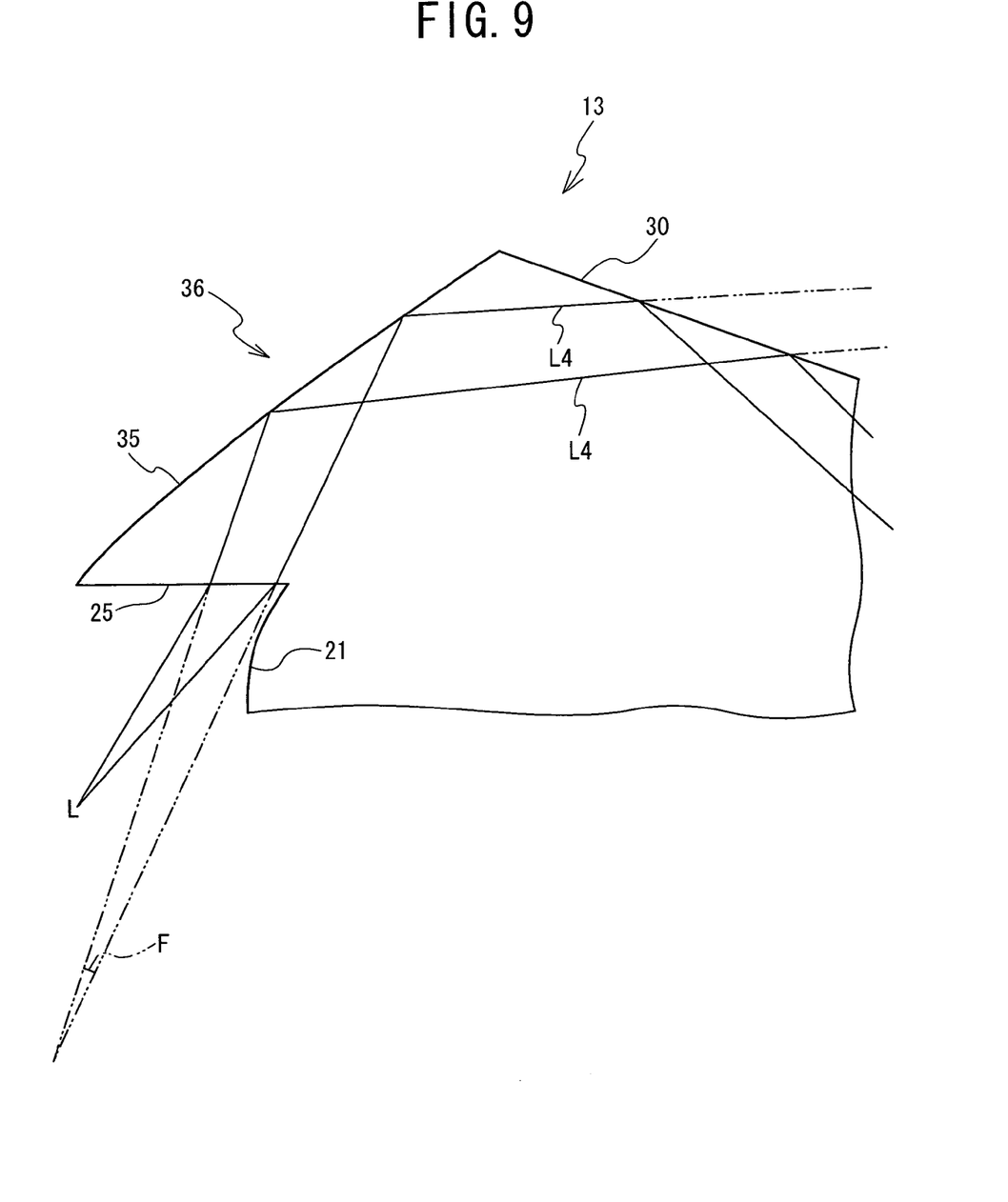
FIG. 9 is a main part enlarged view, in which a second reflecting surface of the prism is enlarged.

FIG. 9 illustrates paths of the rays L4 that enter the prism body 11A from the light source L (refer to FIG. 8) via the incident surface 25. The paths of the rays L4 are enlarged for ease of explanation, and other ray paths are omitted. As shown in FIG. 9, an angle F is the spread angle of the rays L4 each traveling from an entering point to a reflecting point. At the entering point, each of the rays L4 emitted from the light source L enters the prism body 11A via the incident surface 25. At the reflecting point, each of the rays L4 is reflected by the second reflecting surface 35. Although the spread angle of the rays L4 after they have been reflected by the second reflecting surface 35 is not shown in FIG. 9, the first reflecting convex portion 36 is structured such that this spread angle is smaller than the spread angle F.

Normally, when the incident surface of the prism has a flat shape or concave curved shape, if, for example, the divergent light emitted from the light source L enters the prism body, the incident light is propagated as it is as the reasonable divergent light in the medium of the prism body, and reaches a reflecting surface inside the prism while having an increased light flux diameter. In order for the reflecting surface to effectively reflect the rays, a relatively large reflecting surface is required in accordance with the light flux diameter, resulting in an increased size of the prism body itself. In addition, because the incidence angle to the reflecting surface is not substantially uniform in the light flux, some of the rays enter the reflecting surface at an incidence angle that is less than a critical angle. As a result, those rays are not reflected by a total internal reflection and are emitted from the reflecting surface to the outside of the prism body.

In this modified example, the second reflecting surface 35, which reflects the rays L4 that are incident from the flat incident surface 25, has the first reflecting convex portion 36. Owing to the first reflecting convex portion 36, if, for example, the divergent light is incident from the incident surface 25, the rate of light utilization can be increased in the following manner. That is, the incidence angle to the second reflecting surface 35 can be adjusted such that the rays L4 that have entered a prism body 11B via the incident surface 25 are not emitted from the second reflecting surface 35 or the first reflecting surface 30, but totally and internally reflected in a height direction of the prism 10A (in the up-down direction in FIG. 8). Further, in a width direction of the prism 10A (similar to the arrow X direction in FIG. 1), the rays L4 are reflected by the whole area of the second reflecting surface 35 to the first reflecting surface 30.

(2) Modified Example in which More Emitting Portions are Formed than in the Prism 10 of the Above-Described Embodiment In the above-described embodiment, the structure of the prism 10 is explained in which the first emitting portion 40 and the second emitting portion 50 are formed to emit rays to the illumination target area. In this modified example, as shown in FIG. 10, another emitting portion is further formed.

Figure 10:
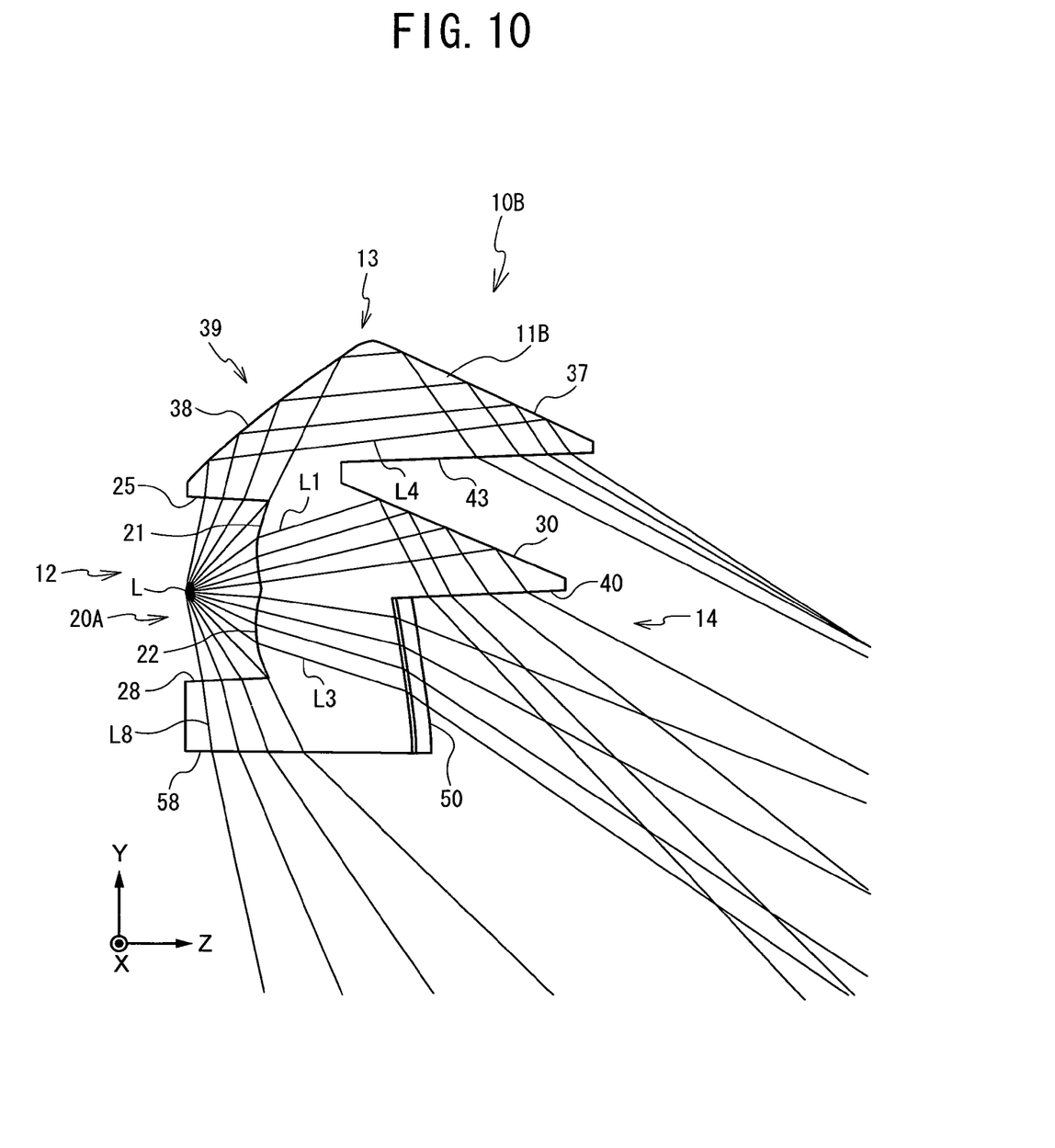
FIG. 10 is a side view of a prism according to another modified example.

FIG. 10 shows paths of rays of light that enter a prism 10B from the light source L and then are emitted from the first emitting portion 40, the second emitting portion 50 and a third emitting portion 43, respectively. The ray paths are simply and schematically illustrated for ease of explanation. Note that structural elements that are denoted with the same reference numeral as those in FIG. 1 to FIG. 9 have the same or similar structure, and repeated explanation of these structural elements is omitted.

A fourth reflecting surface 38 is located on the upper surface side 13 of the prism 10B and can reflect the rays L4 that have entered a prism body 11B via the incident surface 25. The fourth reflecting surface 38 has a second reflecting convex portion 39 that reduces the spread angle of the rays such that the spread angle after the reflection is smaller than that before the reflection. It is preferable that the fourth reflecting surface 38 is structured such that it can cause total internal reflection.

A fifth reflecting surface 37 can reflect the rays L4 that have been reflected by the fourth reflecting surface 38. In this modified example, the fifth reflecting surface 37 is located on the upper surface side 13, in an uppermost position in the back surface side 14 of the prism 10B, and is formed such that it can cause total internal reflection of the rays L4.

The third emitting portion 43 is located above the first emitting portion 40, and emits the rays L4 that have been reflected by the fifth reflecting surface 37, and thus illuminates the illumination target area from above as shown in FIG. 10. In this modified example, the third emitting portion 43 is formed to be contiguous with a lower end of the fifth reflecting surface 37 such that the fifth reflecting surface 37 and the third emitting portion 43 form a substantially wedge shape in a side view. In this manner, in addition to the second emitting portion 50, the first emitting portion 40 and the third emitting portion 43 are formed in the prism 10B in the up-down direction of the back surface side 14. Therefore, more emitting portions are formed than in the prism 10 of the above-described embodiment. Thus, the light that has entered the prism 10B can be effectively used to illuminate an illumination target from above, by changing the direction of the light. Thus, it is possible to suppress shadow generation and to enlarge an illuminated area.

Figure 12:
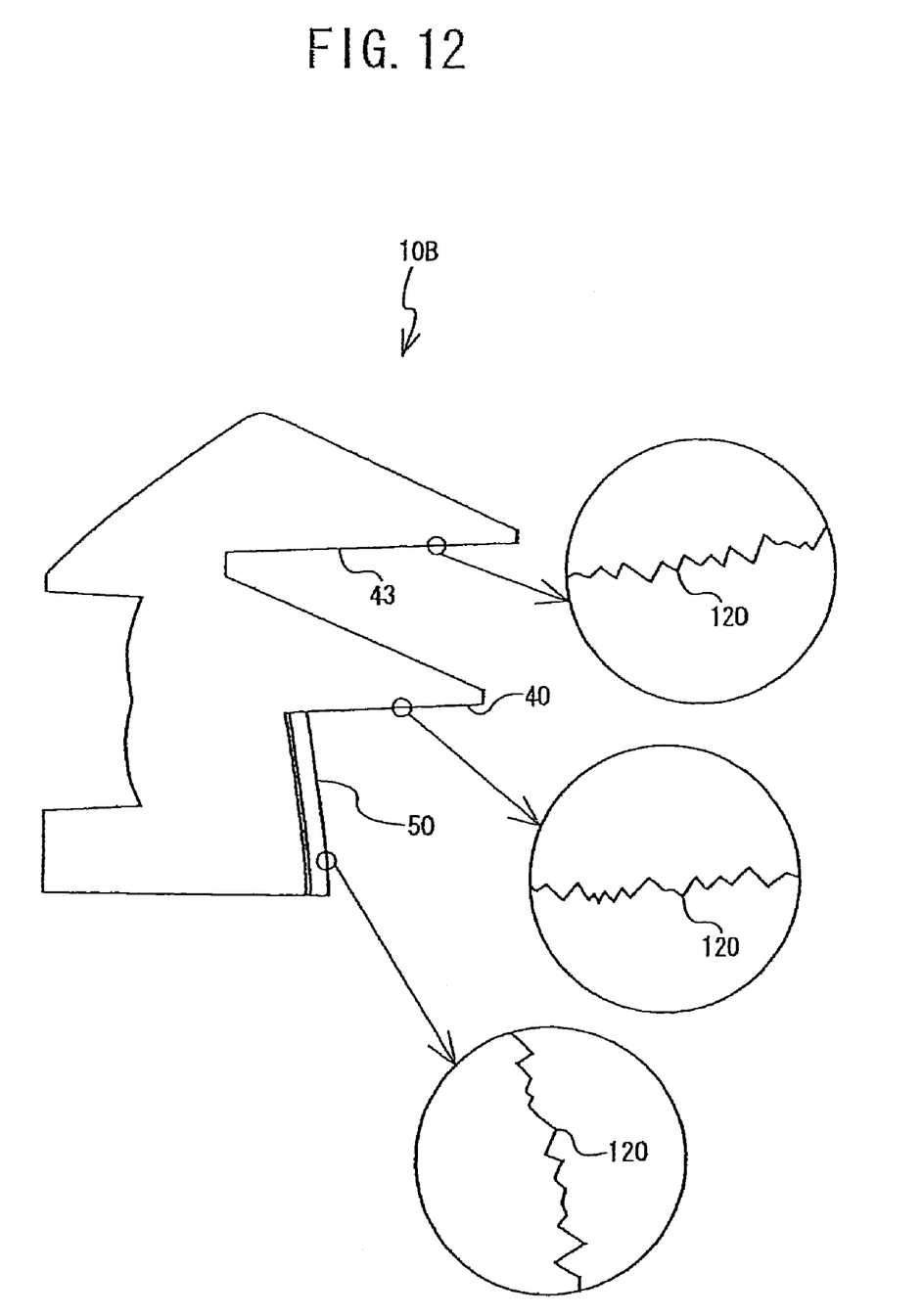
FIG. 12 is a side view of a prism according to a modified example.

(3) FIG. 12 Shows a Modified Example in which a Light Scattering Surface 120 is Formed on Some of the Emitting Portions 43, 40, 50 of a Prism 10B.

In the prism 10B, a light scattering surface 120 may be formed on an emitting portion 43, 40, 50. The light scattering surface 120 may be formed by texturing an emitting surface, or by arranging a light scattering sheet, such as a foamed resin sheet, on a surface side of the emitting portion 43, 40, 50. The light scattering sheet is not particularly limited, and examples of the light scattering sheet include a polyethylene terephthalate resin film that is double coated with calcium carbonate "Light up 75PBA" (made by KIMOTO Co., Ltd.).

As a result of forming the light scattering surface 120 on the emitting surfaces 43, 40, 50, it is possible to scatter light emitted from inside the prism 10B. In this case, the prism 10B can suppress illumination distribution unevenness in the illuminated area. Further, when a white light source with a wide spectral width or a multiple-wavelength light source is used as a light source, the prism 10B can reduce color unevenness. Note that the emitting portion on which the light scattering surface 120 is formed is not particularly limited. The light scattering surface 120 may be formed on all the emitting portions provided on the prism, or may be formed on one or some of the emitting portions.

Lighting analysis simulation results based on differences in the shape of light incident portions is shown below, for the above-described prism and a comparison target prism. The prism 10A shown in FIG. 8 is used as a prism of the embodiment. The radius of curvature of the first convex portion 21 and the second convex portion 22 of the light incident portion 20A is 3.3 mm, and the radius of curvature of the first reflecting convex portion 36 of the second reflecting surface 35 is 30 mm. Further, the height of the prism 10A in the up-down direction is 14 mm.

Figure 11:
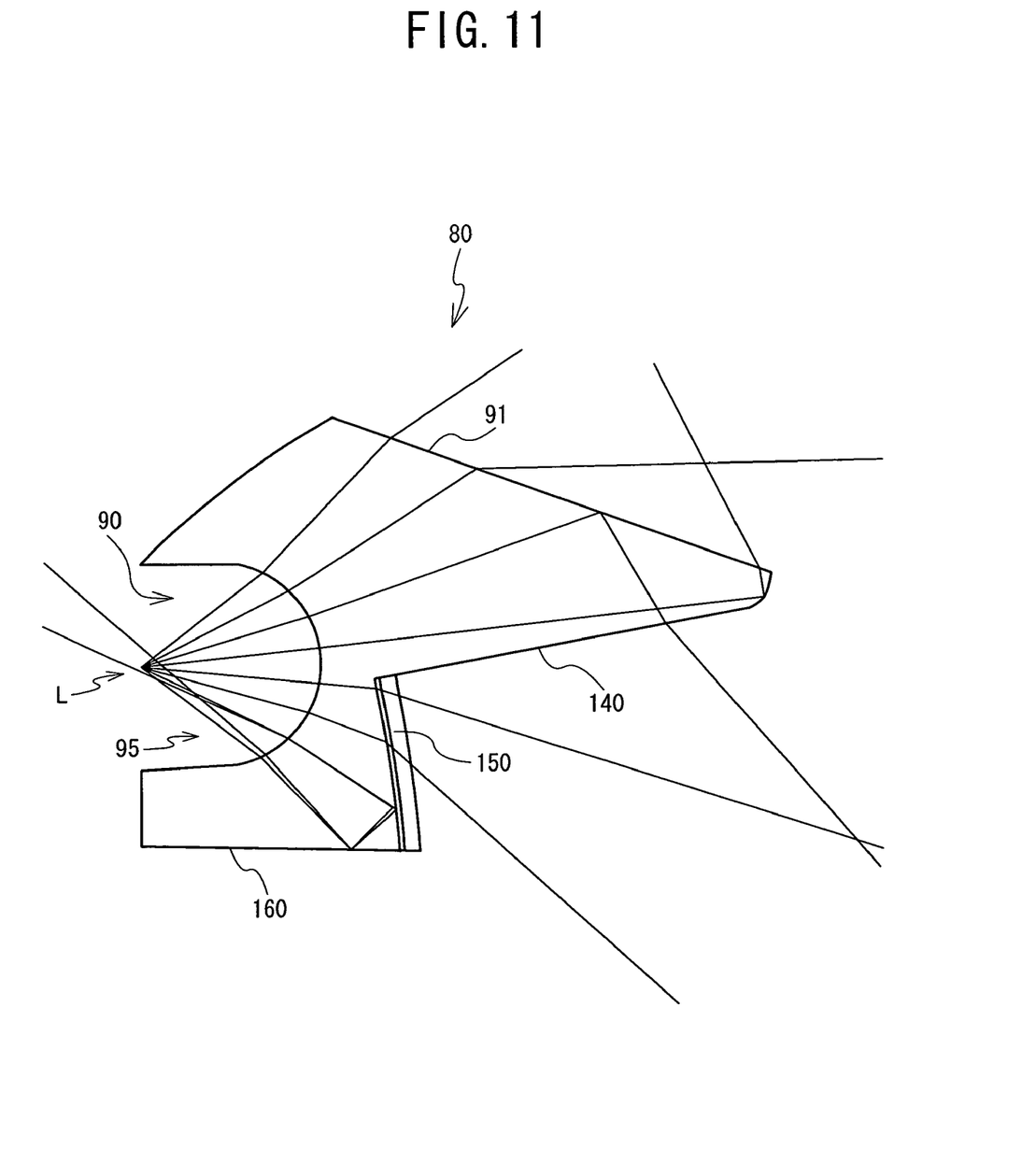
FIG. 11 is a side view of a comparison target prism.

FIG. 11 shows paths of rays of light that enter a comparison target prism 80 from the light source L and then are emitted from an emitting portion 140 and an emitting portion 150 etc. The ray paths are simply and schematically illustrated for ease of explanation. The radius of curvature of a concave portion 95 of a light incident portion 90 is 3.3 mm. When comparing the prism 10A and the prism 80, the sizes of other structural elements of the prism 10A and the prism 80, light source conditions and the like are the same. Table 1 below shows set conditions in this lighting analysis simulation. Note that, in both the prism 10A and the prism 80, a textured light scattering surface is formed on all the surfaces except the light incident portions and the reflecting surfaces, in order to reduce illuminance unevenness and color unevenness.

TABLE 1

| | | |
|---|---|---|
| Light source | Spectral distribution | "White LED SMLK15WBFAW1A" (made by ROHM Co., Ltd.), actual measured light emitting distribution |
| | Light source size | Actually measured light emitting size |
| Prism | Material optical characteristics | Polycarbonate |
| | Mirror surface setting | Mirror surface characteristics |
| | Textured surface setting | "Texturing TH-106 dull finish" (made by TANAZAWA HAKKOSHA Co., Ltd), actually measured light scattering characteristics |
| Light receiving surface | Installation location | 80 mm below light source (illuminated target object) |
| | Size | 600 × 600 mm |
| | Number of pixels | 300 × 300 pixels |
| | Number of analyzed rays | 9 million (equivalent to analysis accuracy of 90%) |

As a result, when the prism 10A of the embodiment was used, the ratio of the light flux that reached an illuminance analysis surface (a light receiving surface) with respect to the light source light flux was 73 percent. On the other hand, when the comparison target prism 80 was used, the ratio of the light flux that reached the illuminance analysis surface with respect to the light source light flux was 51 percent. Note that the ratio of the light flux that reaches the illuminance analysis surface with respect to the light source light flux is an example of an indicator that represents the utilization rate of the light of the light source.

Some of the rays that enter the comparison target prism 80 are spread in the up-down direction in FIG. 11 by the concave portion 95, and are emitted as they are without being reflected by the reflecting surface 91, or are reflected by the emitting portion 150 and a flat surface 160 and emitted from the light incident portion 90. Therefore, light is not effectively emitted from the emitting portion 140 and the emitting portion 150 to illuminate the illumination target area.

On the other hand, as already explained with reference to FIG. 8, the prism 10A of the embodiment includes the light incident portion 20 in which the first convex portion 21, the second convex portion 22 and the first reflecting convex portion 36 of the second reflecting surface 35 are formed. Therefore, it is possible to inhibit the rays that have entered the prism 10A from being emitted from portions other than the first emitting portion 40 and the second emitting portion 50. Thus, it is possible to more effectively illuminate the illumination target area. In this manner, when the prism of the present disclosure is used, light from the light source is effectively reflected inside the prism, and is emitted from the emitting portions to thereby illuminate the illumination target area. Thus, it is possible to improve the rate of light utilization.

What is claimed is:

1. A prism comprising:
   a light incident portion that includes a first convex portion and a second convex portion, the first convex portion and the second convex portion each being a convex portion that refracts rays of light incident to a prism body and reduces a spread angle after incidence to the prism body via the convex portion to be smaller than the spread angle before the incidence, the spread angle being an angle formed between a given two of the rays, the light incident portion further including a flat incident surface on a first side of the first convex portion, the first side being opposite to a second side of the first convex portion, the second convex portion being provided on the second side;
   a first reflecting surface that is provided on the prism body and that is capable of reflecting a first ray of light that has entered the prism body via the first convex portion;
   a first emitting portion that is provided on the prism body and that emits, to the outside of the prism body, the first ray reflected by the first reflecting surface;
   a second emitting portion that emits, to the outside of the prism body, a second ray of light that has entered the prism body via the second convex portion; and
   a second reflecting surface that is provided on the prism body and that is capable of reflecting a third ray of light that has entered the prism body via the incident surface, the second reflecting surface having a first reflecting convex portion that reduces the spread angle after reflection to be smaller than the spread angle before the reflection;
   wherein the first reflecting surface reflects the third ray reflected by the second reflecting surface and the first ray that has entered the prism body via the first convex portion.

2. The prism according to claim 1, wherein:
   the second emitting portion includes a first light emitting surface, a second light emitting surface and a third light emitting surface;
   the first light emitting surface and the second light emitting portion surface each have a convex curved surface; and
   the third light emitting surface couples the first light emitting surface and the second light emitting surface, and has a concave curved surface.

3. The prism according to claim 1, wherein:
   a light scattering surface is formed on at least one of the first emitting portion and the second emitting portion.

4. A prism comprising:
   a light incident portion that includes a first convex portion and a second convex portion, the first convex portion and the second convex portion each being a convex portion that refracts rays of light incident to a prism body and reduces a spread angle after incidence to the prism body via the convex portion to be smaller than the spread angle before the incidence, the spread angle being an angle formed between a given two of the rays, the light incident portion further including a flat incident surface on a first side of the first convex portion, the first side being opposite to a second side, the second convex portion being provided on the second side;
   a first reflecting surface that is provided on the prism body and that is capable of reflecting a first ray of light that has entered the prism body via the first convex portion;
   a first emitting portion that is provided on the prism body and that emits, to the outside of the prism body, the first ray reflected by the first reflecting surface;
   a second emitting portion that emits, to the outside of the prism body, a second ray of light that has entered the prism body via the second convex portion;
   a fourth reflecting surface that is provided on the prism body and that is capable of reflecting a third ray of light that has entered the prism body via the incident surface, the fourth reflecting surface having a second reflecting convex portion that reduces the spread angle after reflection to be smaller than the spread angle before the reflection;
   a fifth reflecting surface that is capable of reflecting the third ray reflected by the fourth reflecting surface; and
   a third emitting portion that is located between the first emitting portion and the fifth reflecting surface and that emits the third ray reflected by the fifth reflecting surface to the outside of the prism body.

5. The prism according to claim 4, wherein:
   a light scattering surface is formed on at least one of the first emitting portion, the second emitting portion and the third emitting portion.

6. The prism according to claim 5, wherein:
   the second emitting portion includes a first light emitting surface, a second light emitting surface and a third light emitting surface;
   the first light emitting surface and the second light emitting surface each have a convex curved surface; and
   the third light emitting surface couples the first light emitting surface and the second light emitting surface, and has a concave curved surface.

7. The prism according to claim 4, wherein:
   the second emitting portion includes a first light emitting surface, a second light emitting surface and a third light emitting surface;
   the first light emitting surface and the second light emitting surface each have a convex curved surface; and
   the third light emitting surface couples the first light emitting surface and the second light emitting surface, and has a concave curved surface.

8. The prism according to claim 4, wherein:
   a light scattering surface is formed on at least one of the first emitting portion and the second emitting portion.

9. A lighting device comprising:
   a prism that includes:
      a light incident portion that includes a first convex portion and a second convex portion, the first convex portion and the second convex portion each being a convex portion that refracts rays of light incident to a prism body and reduces a spread angle after incidence to the prism body via the convex portion to be smaller than the spread angle before the incidence, the spread angle being an angle formed between a given two of the rays, the light incident portion further including a flat incident surface on a first side of the first convex portion, the first side being opposite to a second side of the first convex portion, the second convex portion being provided on the second side;
      a first reflecting surface that is provided on the prism body and that is capable of reflecting a first ray of light that has entered the prism body via the first convex portion;
      a first emitting portion that is provided on the prism body and that emits, to the outside of the prism body, the first ray reflected by the first reflecting surface;

a second emitting portion that emits, to the outside of the prism body, a second ray of light that has entered the prism body via the second convex portion; and a second reflecting surface that is provided on the prism body and that is capable of reflecting a third ray of light that has entered the prism body via the incident surface, the second reflecting surface having a first reflecting convex portion that reduces the spread angle after reflection to be smaller than the spread angle before the reflection, the first reflecting surface reflecting the third ray reflected by the second reflecting surface and the first ray that has entered the prism body via the first convex portion; and a light emitting diode light source.

10. A lighting device comprising:

a prism that includes:

a light incident portion that includes a first convex portion and a second convex portion, the first convex portion and the second convex portion each being a convex portion that refracts rays of light incident to a prism body and reduces a spread angle after incidence to the prism body via the convex portion to be smaller than the spread angle before the incidence, the spread angle being an angle formed between a given two of the rays, the light incident portion further including a flat incident surface on a first side of the first convex portion, the first side being opposite to a second side, the second convex portion being provided on the second side;

a first reflecting surface that is provided on the prism body and that is capable of reflecting a first ray of light that has entered the prism body via the first convex portion;

a first emitting portion that is provided on the prism body and that emits, to the outside of the prism body, the first ray reflected by the first reflecting surface;

a second emitting portion that emits, to the outside of the prism body, a second ray of light that has entered the prism body via the second convex portion;

a fourth reflecting surface that is provided on the prism body and that is capable of reflecting a third ray of light that has entered the prism body via the incident surface, the fourth reflecting surface having a second reflecting convex portion that reduces the spread angle after reflection to be smaller than the spread angle before the reflection;

a fifth reflecting surface that is capable of reflecting the third ray reflected by the fourth reflecting surface; and     a third emitting portion that is located between the first emitting portion and the fifth reflecting surface and that emits the third ray reflected by the fifth reflecting surface to the outside of the prism body; and a light emitting diode light source.

\* \* \* \* \*